US009372767B2

(12) United States Patent
Holtz et al.

(10) Patent No.: US 9,372,767 B2
(45) Date of Patent: Jun. 21, 2016

(54) RECOVERY CONSUMER FRAMEWORK

(71) Applicant: NetApp, Inc., Sunnyvale, CA (US)

(72) Inventors: Tabriz Holtz, Los Gatos, CA (US); Neha Kapoor, Santa Clara, CA (US); Farshid Eslami Sarab, San Jose, CA (US); Afshin Salek Ardakani, Sunnyvale, CA (US); Tara Faith Olson, Mountain View, CA (US); Asif Imtiyaz Pathan, Sunnyvale, CA (US); Prahlad Purohit, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 209 days.

(21) Appl. No.: 14/298,344

(22) Filed: Jun. 6, 2014

(65) Prior Publication Data

US 2015/0355985 A1    Dec. 10, 2015

(51) Int. Cl.
*G06F 11/00* (2006.01)
*G06F 11/20* (2006.01)
*G06F 11/16* (2006.01)

(52) U.S. Cl.
CPC ........ *G06F 11/2094* (2013.01); *G06F 11/1666* (2013.01); *G06F 2201/84* (2013.01)

(58) Field of Classification Search
CPC ........ G06F 11/1658–11/1666; G06F 11/1402; G06F 11/1446–11/1448; G06F 11/1469; G06F 11/1076–11/1096; G06F 2211/1002–2211/1095; G06F 11/2094
See application file for complete search history.

(56) References Cited

U.S. PATENT DOCUMENTS

| 5,948,110 | A | 9/1999 | Hitz et al. |
| 5,951,695 | A | 9/1999 | Kolovson |
| 7,386,752 | B1 * | 6/2008 | Rakic .................. G06F 11/1469 714/2 |

(Continued)

OTHER PUBLICATIONS

Bhide, et al., A Highly Available Network File Server, In Proceeding of the Winter USENIX Conference, 1991, 10 Pages.

*Primary Examiner* — Jason Bryan
(74) *Attorney, Agent, or Firm* — LeClairRyan, a Professional Corporation (57) ABSTRACT

A recovery consumer framework provides for execution of recovery actions by one or more recovery consumers to enable efficient recovery of information (e.g., data and metadata) in a storage system after a failure event (e.g., a power failure). The recovery consumer framework permits concurrent execution of recovery actions so as to reduce recovery time (i.e., duration) for the storage system. The recovery consumer framework may coordinate (e.g., notify) the recovery consumers to serialize execution of the recovery actions by those recovery consumers having a dependency while allowing concurrent execution between recovery consumers having no dependency relationship. Each recovery consumer may register with the framework to associate a dependency on one or more of the other recovery consumers. The dependency association may be represented as a directed graph where each vertex of the graph represents a recovery consumer and each directed edge of the graph represents a dependency. The framework may traverse (i.e., walk) the framework graph and for each vertex encountered, notify the associated recovery consumer to initiate its respective recovery actions.

20 Claims, 6 Drawing Sheets

(56) References Cited

U.S. PATENT DOCUMENTS

| | | |
|---|---|---|
| 7,698,306 B2 | 4/2010 | Watanabe |
| 7,730,153 B1 | 6/2010 | Gole et al. |
| 7,930,587 B1 | 4/2011 | Coatney et al. |
| 7,979,402 B1 | 7/2011 | Hamilton et al. |
| 8,412,682 B2 | 4/2013 | Zheng et al. |
| 8,495,417 B2 | 7/2013 | Jernigan et al. |
| 8,626,721 B2 | 1/2014 | Bradshaw |
| 8,645,399 B2 | 2/2014 | McNeill et al. |
| 9,021,303 B1 * | 4/2015 | DeSouter ............ G06F 11/1458 714/15 |
| 2009/0094478 A1 * | 4/2009 | Harper ................ G06F 11/2025 714/3 |
| 2012/0266011 A1 | 10/2012 | Storer et al. |

* cited by examiner

FIG. 7

RECOVERY CONSUMER FRAMEWORK

BACKGROUND

1. Technical Field

The present disclosure relates to storage systems and, more specifically, to efficient use of recovery information to recover a storage system.

2. Background Information

A storage system typically includes one or more storage devices into which information may be entered, and from which information may be obtained, as desired. The storage system may logically organize the information stored on the devices as storage containers, i.e., a logical pool of storage. Each storage container may be implemented as a set of data structures, such as data blocks that store data for the storage containers and metadata blocks that describe the data of the storage containers. The storage system may be configured to log portions of the data and metadata as recovery information for the storage containers in the event of a storage system failure (e.g., a power failure).

The storage system also may be configured to provide services relating to access of the data in the storage containers stored on the storage devices. The services may be configured to operate according to a client/server model of information delivery to thereby allow many clients (hosts) to access the storage containers. In other words, the storage system may service client data access requests from the storage containers.

In the event of a failure, the storage system may be configured to initiate recovery actions that apply recovery information to the storage containers so as to avoid information (i.e., data and metadata) loss. Depending on the recovery needs for a storage container, a different amount of recovery information may be applied. That is, the amount of recovery information (and recovery time) required for a storage container after a failure event may vary from storage container to storage container. Further, recovery actions are often performed serially across all storage containers, regardless of the amount of recovery time actually required for each storage container. Serial recovery is typically performed because a dependency of the recovery information (and recovery actions) needed among the storage containers is often unknown. Generally, it is desirable for the storage containers to become available to service data access requests as soon as practicable after a failure event. However, when the dependency of recovery information among the storage containers is unknown, recovery of the storage containers may be inefficient. As a result, there may be substantial disparity among the storage containers with respect to duration of recovery, e.g., some storage containers may require only minutes of recovery time while others may require hours. As such, the availability of some storage containers to service data access requests after a failure event may be unnecessarily delayed.

Thus, there is a need for efficient use of recovery information for storage systems.

BRIEF DESCRIPTION OF THE DRAWINGS

The above and further advantages of the disclosure herein may be better understood by referring to the following description in conjunction with the accompanying drawings in which like reference numerals indicate identically or functionally similar elements, of which.

OVERVIEW

The subject matter described herein provides a recovery consumer framework for execution of recovery actions by one or more recovery consumers to enable efficient recovery of information (e.g., data and metadata) in a storage system after a failure event (e.g., a power failure). To that end, the recovery consumer framework permits concurrent execution of recovery actions so as to reduce recovery time (i.e., duration) for the storage system.

Illustratively, the recovery consumers may include recovery actions (i.e., procedures) using one or more associated recovery logs, whereas the recovery actions may include various types of actions, such as a replay of one or more of the recovery logs. As used herein, a recovery log may include any self-describing set of information, e.g., a log of host data access requests, which includes a set of specific properties, such as whether the log is online. Furthermore, the recovery log may be an intent log, which includes information (e.g., data and metadata) recorded in the log prior to storage of that information in one or more storage containers of the storage system. When executing the recovery actions, the recovery consumers may apply the recovery logs to the one or more storage containers to avoid loss of information after a failure event. The recovery consumer framework may coordinate (e.g., notify) the recovery consumers to serialize execution of the recovery actions by those recovery consumers having a dependency. However, for those consumers having no dependency relationship, the recovery consumer framework allows parallel (i.e., concurrent) execution of their recovery actions, thereby substantially increasing efficiency, i.e., reducing recovery time, after the failure event.

Illustratively, each recovery consumer may register with the framework to associate a dependency on one or more of the other recovery consumers. That is, the recovery consumer may declare a dependency such that the respective recovery actions of the consumer are not executed until all dependent consumers have completed their respective recovery actions, e.g., consumer 1 that depends on consumer 2 waits until consumer 2 has completed all of its recovery actions. Accordingly, the recovery consumers may be ordered such that their recovery actions are executed serially according to their dependencies. The framework may implement such dependency association as a directed graph where each vertex (i.e., graph node) of the graph represents a recovery consumer and each directed edge of the graph represents a dependency. Alternatively, the declaration of a dependency among the recovery consumers may be determined by a dependency rule set based on registration of a type of recovery action rather than a registration of the dependency. For example, consumer 1 may include (and thus register) a type of action to replay logs related to redundancy information among storage devices, whereas consumer 2 may include (and thus register) a type of action to replay logs related to host data access requests. An exemplary rule may specify that the log having the redundancy information be replayed before the log having the data access requests. As a result, a framework graph may be constructed (i.e., vertex and edge added) in accordance with the exemplary rule to illustrate that consumer 2 (first vertex) depends on (directed edge) consumer (second vertex) and a path from the first vertex to the second vertex may denote that the recovery actions of consumer 2 are executed after (i.e., wait on) the recovery actions of consumer 1. Notably, the framework graph may be implemented such that independent paths in the graph represent those recovery consumers which may execute their recovery actions in parallel.

Illustratively, the framework may traverse (i.e., walk) the framework graph and, for each vertex encountered, notify the associated recovery consumer to initiate its respective recovery actions. Specifically, the framework may traverse the graph breadth first, so that recovery consumers without associated dependencies may be notified in parallel and, thus, may execute their actions concurrently, while consumers having associated dependencies may be organized for serialized execution of their recovery actions. Illustratively, a framework technique may be employed whereby each recovery consumer may tag (i.e., associate) one or more of the recovery logs depending on the nature of the failure and the properties of the logs (e.g., whether the log is online). Further, the tags may direct the actions (e.g., encode instructions) of the recovery consumers. As each recovery consumer completes execution of its respective recovery actions, the framework is notified of completion and the tag is removed from the associated log. The framework may then notify, e.g., in serial fashion, a next dependent (i.e., waiting) consumer to initiate its respective recovery actions. In this manner, the consumer recovery framework ensures that all recovery consumers execute their respective recovery actions while permitting a high degree of parallelism and satisfying the consumer dependencies.

Description

HA Storage System

Figure 1:
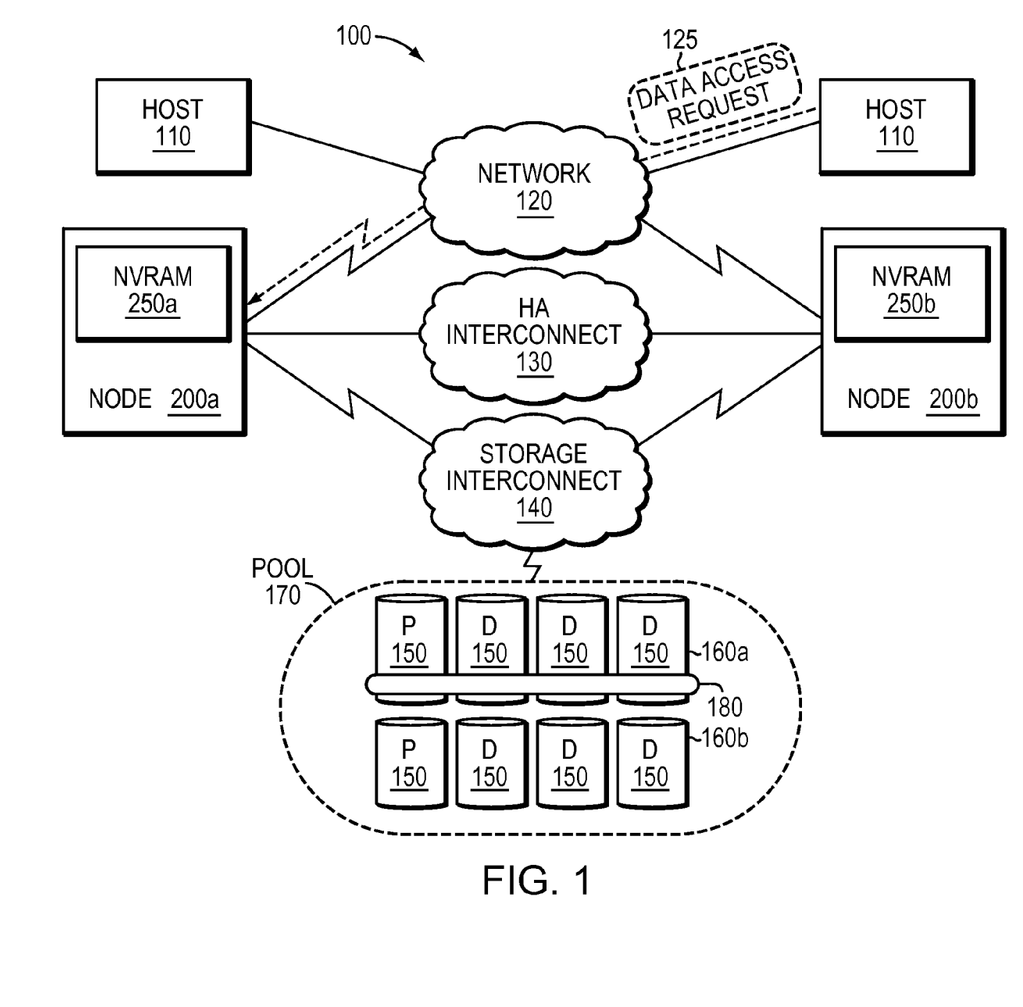
FIG. 1 is a block diagram of a high-availability storage system.

FIG. 1 is a block diagram of a high-availability (HA) storage environment 100, including nodes 200a,b, and configured to provide storage services relating to organization of and access to information on storage devices 150. The nodes 200 may be interconnected by a HA interconnect 130 and include functional components that cooperate to form a HA storage architecture of the environment 100, which may be deployed in a storage area network (SAN) to provide the storage services to one or more hosts 110. Illustratively, the arrangement of nodes 200 as an HA pair enables redundancy within the environment 100 such that, if one node should fail, the other node (HA partner node) may assume its role by performing a takeover. It should be understood that illustration of only two nodes 200a,b in the HA storage environment 100 is solely for ease of depiction and brevity, and that additional nodes may be interconnected in various HA arrangements to provide takeover for one or more failed nodes.

Each host 110 may be embodied as a general-purpose computer configured to interact with any node 200 in accordance with a client/server model of information delivery. That is, the client (host) may request the storage services of the node, and the node may return the results of the services requested by the host, by exchanging packets over the network 120. The host may issue packets forming a data access request 125 according to file-based access protocols, such as the Network File System (NFS) protocol over the Transmission Control Protocol/Internet Protocol (TCP/IP), when accessing information on the node in the form of files and directories. Alternatively, the host 110 may issue packets forming a data access request 125 according to block-based access protocols, such as the Small Computer Systems Interface (SCSI) protocol encapsulated over TCP (iSCSI) and SCSI encapsulated over FC (FCP), when accessing information in the form of logical units (LUNs). Notably, any of the nodes 200 may service the data access request 125 for information in any form stored on the HA storage environment 100.

As described herein, the components of each node 200 may include hardware and software functionality that enable the node to connect to one or more hosts 110 over computer network 120, as well as to a storage pool 170 of one or more storage devices 150 over a storage interconnect 140, to thereby render the storage services in accordance with the HA storage architecture. Each storage pool may be organized into one or more groups 160 of storage devices 150 arranged as Redundant Array of Independent (or Inexpensive) Disks (RAID). Generally, RAID implementations enhance the reliability (i.e., integrity) of data storage through a redundancy technique of writing information in "stripes" across a number of storage devices together with appropriate parity information with respect to each stripe. Each RAID group 160a,b may be implemented according to a RAID level, such as RAID-4 or another type of RAID implementation, such as RAID double-parity (RAID-DP). It should be understood that a variety of other levels and types of RAID may alternatively be implemented and may differ from RAID group to RAID group (e.g., RAID group 160a may use RAID-4 while RAID group 160b may use RAID-DP). Further, one or more RAID groups 160a,b may be organized into aggregates (not shown) that represent collections of storage within the storage pool 170.

To facilitate access to data stored in the HA storage environment 100, the nodes 200 may "virtualize" the storage pool. To that end, the storage pool 170 may be logically organized into one or more storage containers 180 (e.g., volumes) formed from a portion, e.g., a whole or part, of one or more RAID groups 160. In other words, storage of information may be implemented as one or more "volumes" that illustratively include a collection of storage devices 150 (e.g., RAID group 160) cooperating to define an overall logical arrangement of the volume(s). A storage container 180 may span one or more RAID groups 160, in whole or in part. Each storage container 180 may be "owned" by a single node 200 which is configured to perform operations (e.g., service the data access requests) directed to that storage container in fulfillment of the storage services.

To promote recovery in the event of failure, each node 200 may log information, such as operations (e.g., data access requests) directed to the storage container owned by the node that have been acted upon (i.e., serviced) but not yet been committed (i.e., persistently stored) to the storage devices. The logged information may be maintained in a non-volatile random access memory (NVRAM) 250 of the node 200 that owns the storage container. During normal operation, information logged in the NVRAM of the node 200 may be mirrored to the NVRAM of its HA partner node to provide redundancy. For example, information logged in the NVRAM (e.g., 250a) of the node 200a may be mirrored to and maintained in the NVRAM 250b of the HA partner node 200b. In response to a failure of the node 200a, the HA partner node 200b may initiate a takeover sequence to, e.g., assume the identity of the failed node, access the storage devices owned by the failed node and replay the mirrored information maintained in its NVRAM 250b, as well as otherwise take over for the failed node. As part of the sequence, contents of the mirrored information of the NVRAM 250a may be copied (i.e., saved) to the storage pool for subsequent processing, such as when storage containers (or the underlying aggregates) are off-line during recovery. An example takeover sequence is described in commonly owned U.S. Pat. No. 7,730,153 titled EFFICIENT USE OF NVRAM DURING TAKEOVER IN A NODE CLUSTER to Gole et al., issued on Jun. 1, 2010.

Figure 2:
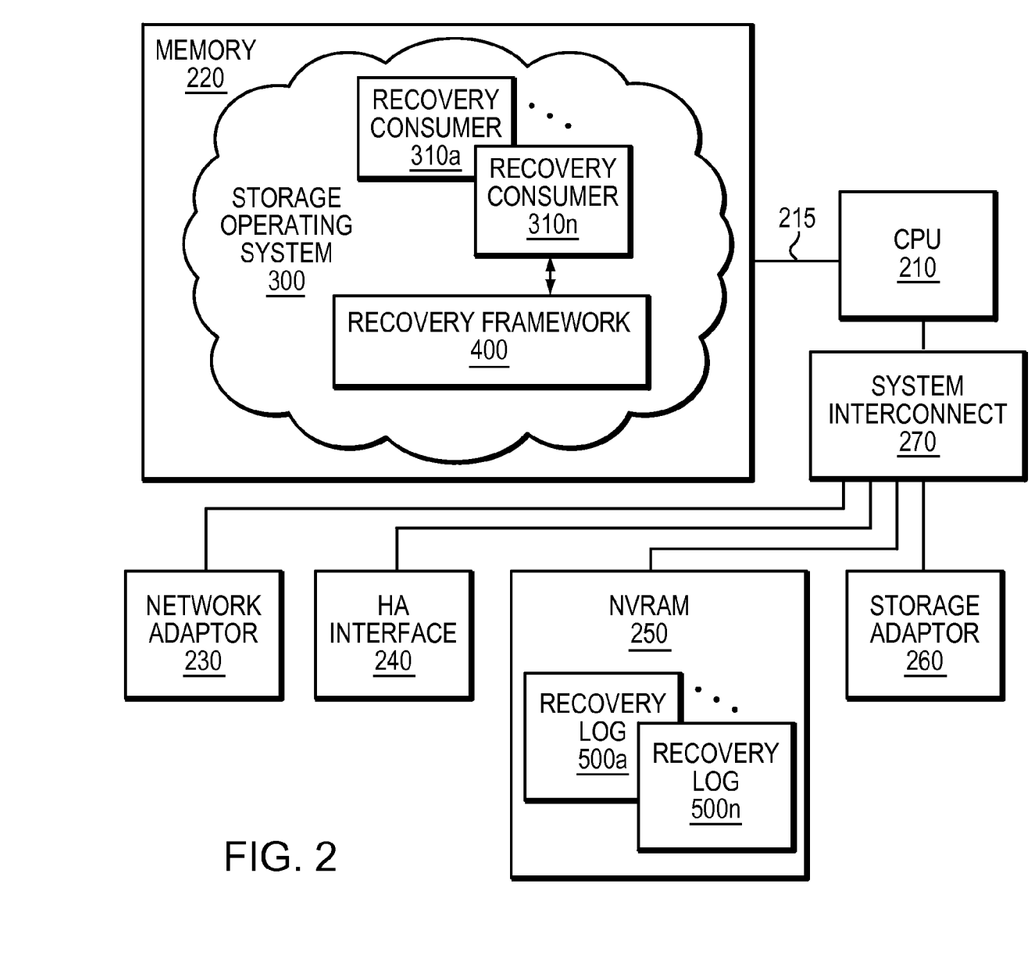
FIG. 2 is a block diagram of a node of the high-availability storage system.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage adapter(s) 250, a HA interface 240 and a non-volatile random access memory (NVRAM 250) via a system interconnect 270. The network adapter 230 may include one or more ports adapted to couple the node 200 to the host(s) 110 over computer network 120, which may include point-to-point links, wide area networks, virtual private networks implemented over a public network (Internet) or a shared local area network. The network adapter 230 thus includes the mechanical, electrical and signaling circuitry needed to connect the node to the network 120, which illustratively embodies an Ethernet or Fibre Channel (FC) network. The storage adapter 260 may include one or more ports adapted to couple the node 200, via the server interconnect 140 (e.g., FC switch), to the storage devices 150. The storage adapter may also cooperate with a storage operating system 300 executing on the node 200 to service operations (e.g., data access requests). In one implementation, the storage adapter 260 may take the form of an FC host bus adapter (HBA).

The HA interface 240 may include one or more ports adapted to couple the node 200 to the HA partner node (or a plurality of other nodes). Illustratively, Ethernet may be used as the clustering protocol and HA interconnect 130, although it will be apparent to those skilled in the art that other types of protocols and interconnects, such as Infiniband, may be utilized within the implementations described herein.

The memory 220 may include memory locations for storing at least some of the software functionality illustratively implemented as software programs and data structures. Among the software programs may be storage operating system 300 that functionally organizes the node 200 by, among other things, invoking operations in support of the storage services provided by the node 200. In an implementation, the storage operating system is the NetApp® Data ONTAP™ operating system available from NetApp Inc., Sunnyvale, Calif. that implements a Write Anywhere File Layout (WAFL®) file system. Accordingly, one or more storage containers 180 (e.g., volumes) may be configured according to the WAFL file system. However, a variety of other types of storage operating systems that implement other types of file systems may alternatively be utilized. As such, where the term "WAFL" is employed, it should be taken broadly to refer to any storage operating system that is otherwise adaptable to the teachings of the disclosure herein.

As noted, the NVRAM 250 may store (record) information, such as operations (e.g., data access requests) serviced by the node 200 that have not yet been committed (i.e., persistently stored) to the storage devices. Such information may be maintained in one or more recovery logs 500a-n stored in a portion of the NVRAM 250. That is, a portion of the NVRAM 250 may be configured as one or more non-volatile logs (i.e., recovery logs 500) configured to temporarily record ("log") data access requests 125 (e.g., write requests) received from the host(s) 110. In order to persistently store the logged information, the NVRAM 250 may include a back-up battery, or be designed to intrinsically have last-state retention capability (e.g., utilize non-volatile semiconductor memory) that allows the NVRAM to maintain information through system restarts, power failures, and the like. It should be noted that the recovery logs 500 may be persistently stored in the storage pool.

The storage operation system 300 may include software components (e.g., modules), such as one or more recovery consumers 310a-n which may implement procedures and techniques described herein. Illustratively, the recovery consumers may include recovery actions (i.e., procedures) to restore the storage container(s) 180 using the information logged in the recovery logs 500 of the NVRAM 250 when a failure event (e.g., a power failure, a node failure) occurs. To that end, the storage operating system 300 may also include a recovery framework 400 for efficiently coordinating the recovery consumers in response to the failure event. Additionally, the recovery framework 400 may provide a recovery framework application programming interface (API) to support coordination among the recovery consumers.

Storage Operating System

Figure 3:
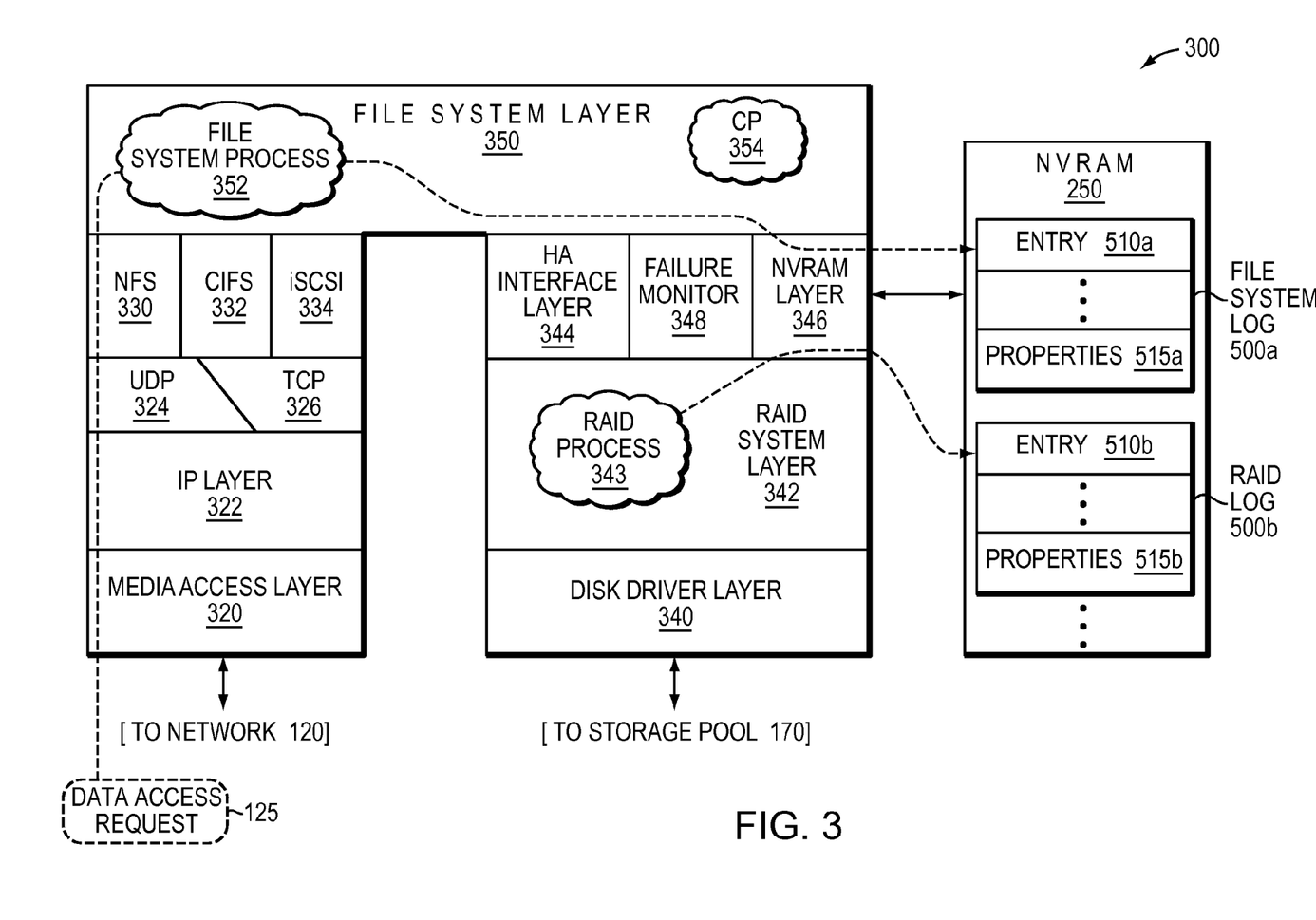
FIG. 3 is a block diagram of a storage operating system of the node.

FIG. 3 is a block diagram of the storage operating system 300 (e.g., Data ONTAP™) of each node 200. The storage operating system 300 may implement specialized server operations, such as servicing of the data access requests 125, provided on each node. Illustratively, the storage operating system includes a series of software layers organized to form an integrated network protocol stack that provides data paths for hosts (clients) 110 to access information stored on the node 200 using block and file data access protocols, e.g. iSCSI and NFS protocols. To that end, the storage operating system 300 further includes a media access layer 320 of network drivers (e.g., gigabit Ethernet drivers) that interfaces to network protocol layers, such as the IP layer 322 and its supporting transport mechanisms, the User Datagram Protocol (UDP) layer 324 and the Transport Control Protocol (TCP) layer 326. A file system protocol layer includes support for the Network File System (NFS) protocol 330, the Common Interface File System (CIFS) protocol 332, and the Internet Small Computer System Interface (iSCSI) protocol 334.

In addition, the storage operating system includes storage layers, such as a RAID system layer 342 that implements a redundancy technique (e.g., RAID 4) for the RAID groups 160, and a storage driver layer 340 that implements a disk access protocol (e.g., SCSI). Additional software layers of the storage operating system 300 include a HA interface layer 344 for controlling the operation of the HA interconnect 130 between nodes 200a,b, a NVRAM layer 346 for storing and retrieving information from the NVRAM 250 and a failover monitor 348 that monitors the health of the HA storage system. The failover monitor 348 may include a data structure, such as a failover monitor resource table, configured to itemize monitored resources. Bridging the network protocol layers and the storage layers of the storage operating system is a file system layer 350 that organizes and controls (i.e., manages) storage and retrieval of information on the storage devices and, in particular, on the storage container(s) 180 of the storage pool 170.

It should be noted that the operating system layers described above may alternatively be implemented in hardware. That is, in an alternative aspect of the disclosure, one or more layers of the storage operating system 300 may be implemented as logic circuitry embodied within a field programmable gate array (FPGA) or an application specific integrated circuit (ASIC). This type of hardware implementation increases the performance of the storage services provided by node 200.

Illustratively, a data access request 125 directed to the storage container 180 is received via the network 120 and processed by a file system process, e.g., a WAFL process 352, of the storage operating system 300. The request may be recorded (i.e., written) as an entry 510*a* in the recovery log 500*a* (i.e., file system recovery log). The entry may include metadata of the data access request, such as a type of access request (e.g., "create file" and "write file data") as well as any data included with the data access request. As such, the recovery log 500*a* may operate as an intent log configured to retain information (e.g., data and metadata) recorded prior to storage of that information in the storage container 180. Widely used file and block data access protocols, such as NFS and iSCSI respectively, specify that a servicer (i.e., node 200) of a data access request should not reply (i.e., return a response) to the data access request until the request is completed (e.g., data of the access request is written to persistent storage). This specification may be satisfied by recording the data access request to NVRAM, thereby permitting a reply to be quickly returned to the requesting host (client) 110. Accordingly, data access requests which modify storage containers 180 are recorded in the recovery log 500*a*. Further, the recovery log 500*a* may include properties 515*a* pertaining to a state or aspect of the log, such as a number of entries in the log and whether the log is online. Notably, the recovery log 500*a* may operate as a transaction journal of storage container changes (e.g., entry 510*a*) which may be replayed, so as to restore a consistent state of the storage container in the event of a failure. It will be understood to those skilled in the art that other variations of data structures may be used to store or maintain the information in the NVRAM, including logical organizations of the logs by type of entry and data structures with no logs.

A RAID process 343 of the storage operating system may provide a RAID implementation as previously described. The RAID process 343 may log information, such as parity and metadata, related to a RAID operation (e.g., writing a stripe) prior to committing (i.e., "flushing") that information to the RAID group 160. A RAID computation may be stored as an entry 510*b* in a recovery log 500*b* (RAID recovery log). Further, the recovery log 500*b* may include properties 515*b* pertaining to a state or aspect of the log, such as a number of entries in the log and whether the log is online. Notably, the RAID recovery log 500*b* may operate as a transaction journal of changes (e.g., entries 510) to the RAID group which may be replayed, so as to restore a consistent state of the RAID group in the event of a failure.

The NVRAM may temporarily store entries 510 of the recovery logs 500 until such time as a consistency point (CP) is reached, which may occur at a fixed time interval (e.g., 10 seconds) or at other triggering events (e.g., NVRAM half full). At such time, accumulated entries in the recovery logs 500 may be committed (i.e., flushed) to the storage devices, thereby completing the CP by ensuring that the storage container(s) and RAID groups are consistent. Illustratively, the file system layer 350 may include a consistency point (CP) process 354 that implements the CP by flushing recovery log information (i.e., contents of the entries 510) in the recovery logs 500 to the storage devices (i.e., the storage container(s) and the RAID groups). The CP process 354 may also track the occurrence of CPs, wherein each CP may be identified by a unique CP number that is generated by a monotonically increasing CP count. For example, a value of the CP count may be incremented for each CP occurrence such that the CP count value increases over time and a greater value of the CP count indicates a CP later in time. Accordingly, entries 510 in the recovery logs may be discarded when associated with an older CP (i.e., lesser CP count value) than the CP currently processed. Alternatively, the CP count may be generated using other techniques to provide each CP with a unique identifier. The CP count may be stored in the recovery log properties 515*a*. In an implementation, the CP count may also be stored as part of each log entry 510*a*. Further, the CP count may be stored as metadata within the storage container at the completion of the CP so as to timestamp a consistent state of the storage container. Following completion of the CP, the recovery logs may be discarded (emptied).

However prior to completion of the CP, any system interruption, power loss, or failure may be recoverable through replay of the recovery logs from the previous CP. Since the NVRAM 250 is constructed to survive power failures and other mishaps, the contents of the recovery logs 500 are appropriately protected. These logs may be retrieved by the recovery consumers 310 under coordination of the recovery framework 400 during recovery, i.e., when a failure occurs. As noted, the storage container(s) may be formed from one or more RAID groups 160. Accordingly, any storage or retrieval of data to/from the storage container 180 depends on the underlying RAID group(s) 160. When a failure occurs, the RAID recovery log 500*b* may be replayed to restore the RAID group(s) to a consistent state prior to replay of the file system recovery log 500*a* to restore the storage container to a consistent state. Illustratively, a first recovery consumer (e.g., the RAID consumer) having actions that process (e.g., replay) the RAID recovery log 500*b* may execute prior to a second recovery consumer (e.g., the file system consumer) having actions that process (e.g., replay) the file system recovery log 500*a*. Thus, the second consumer depends on the first consumer. Further, a third recovery consumer (e.g., a NVSAVE consumer) may copy (i.e., write) the mirrored contents of the failed HA partner node's NVRAM to the storage pool immediately after a takeover. The third recovery consumer actions (i.e., copying NVRAM contents) may be performed concurrently with the first and second recovery consumer actions, respectively, which process recovery logs from the NVRAM. In other words, the first consumer and second consumer are independent of (i.e., may execute concurrently with) the third consumer. In general, recovery consumers that process recovery logs which are independent of each other may be executed concurrently.

Recovery Framework

As described herein, the recovery consumer framework provides for execution of recovery actions by one or more recovery consumers to enable efficient recovery of information (e.g., data and metadata) in a storage system after a failure event (e.g., a power failure). Illustratively, the recovery consumers 310 may include recovery actions (i.e., procedures) using one or more associated recovery logs, whereas the recovery actions may include various types of actions, such as a replay of one or more of the recovery logs. As used herein, a recovery log 500 may include any self-describing set of information, e.g., a log of the host data access request 125. Each recovery consumer may process (e.g., replay) one or more of the recovery logs. For example, the recovery consumer 310*a* may process the file system recovery log 500*a* and another recovery consumer 310*b* may process the RAID recovery log 500*b*. When executing the recovery actions, the recovery consumers may apply the recovery logs to the one or more storage containers to avoid loss of information after a failure event. The recovery consumer framework 400 may coordinate (e.g., notify) the recovery consumers to serialize execution of the recovery actions by those recovery consumers having a dependency. However, of those recovery consumers having no dependency relationship, the recovery consumer framework allows parallel (i.e., concurrent) execution of their recovery actions, thereby substantially increasing efficiency, i.e., reducing recovery time, after the failure event.

To determine whether a recovery log is needed in recovery, a tagging technique may be employed to determine whether a recovery log is used by a recovery consumer during recovery. Illustratively, each recovery consumer may register one or more callbacks with the recovery framework 400 in accordance with the tagging technique whereby the recovery framework 400 may invoke (i.e., call) the registered tag callback for the recovery consumer to determine whether a recovery log is used by that recovery consumer during recovery. Further, each recovery consumer may also register a dependency on one or more of the other recovery consumers.

Figure 4:
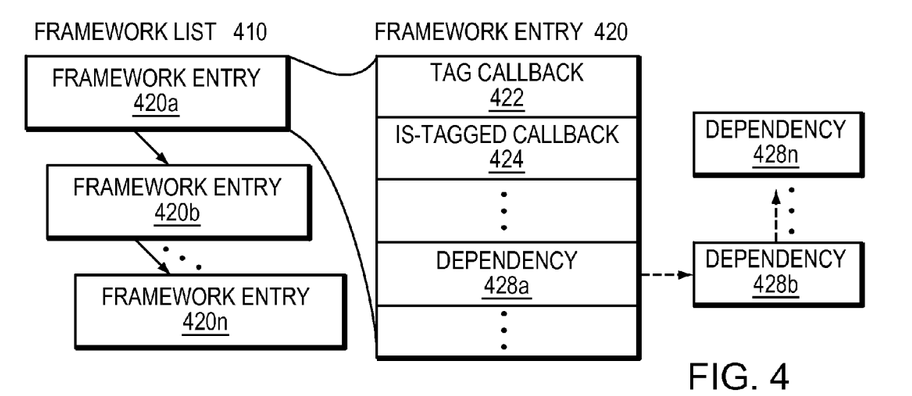
FIG. 4 is block diagram of a data structure of a recovery framework.

FIG. 4 is block diagram of a data structure of the recovery framework. In an implementation, a framework list 410 may embody a linked list of framework entries 420 used to register consumers and associate one or more dependencies. Each framework entry 420 may correspond to a registering recovery consumer. As a recovery consumer 310 registers with the recovery framework 400, a framework entry 420 may be created in the memory 220 and inserted into the framework list 410. It will be understood to those skilled in the art that other variations of data structures, such as e.g., trees and arrays, may be used to maintain the data in the framework entries 420. Each framework entry 420 may include a tag callback 422 field containing a callback (e.g., function pointer) to a tag procedure (not shown) associated with the registering recovery consumer. The tag procedure may determine whether a recovery log (e.g., file system recovery log 500a) is used by the registering recovery consumer during recovery. In other words, the tag procedure may determine whether a recovery log is used by the registering recovery consumer during recovery and, if so, may "tag" the recovery log. Accordingly, a recovery log may be tagged when a recovery consumer uses that log. The tag callback may also include a first parameter indicating the storage container(s) (e.g., volumes) to be recovered (e.g., serviced by the failed node) and a second parameter indicating the recovery log. It will be apparent to those skilled in the art that the tag callback parameters may be pointers to data structures respectively representing the storage container and one or more recovery logs 500.

Illustratively, the recovery consumer tag callback (i.e., tag callback) may include querying of the log properties 515, such as the number of entries 510 in the recovery log, and, in response, may tag the log. For example, in response to a query of a log having zero entries, the tag procedure may determine not to process the log and, thus, not tag the log. In another implementation, the tag procedure may query a CP count log and, in response, tag the log. For instance, when the CP count associated with the log is less than the CP count of the storage container to be recovered, the tag procedure may determine not to process (i.e., replay) that log. That is, in response to determining not to process the recovery log, the tag procedure does not tag the log.

In addition to querying the recovery log properties 515 to determine whether to process (and thus tag) a recovery log, individual log entries 510, such as a CP count associated with a log entry, may be examined. When a portion (e.g., at least one log entry) of a recovery log is used by a recovery consumer during recovery, the recovery consumer tag callback may tag that log, i.e., the recovery log (as a whole) may be tagged by the recovery consumer tag callback. However, failure to "tag" a recovery log may indicate that the log is unused by the recovery consumer that registered that tag callback. For example, a recovery log may include one log entry with an associated CP count value that is greater (i.e., newer) than that of the last CP count value of the storage container in recovery. Replay of the one log entry may thus suffice to restore the storage container to a consistent state, i.e., only the single log entry from the entire log is replayed.

Tagging (i.e., marking) of the recovery log by the tag procedure (i.e., tag callback registered by the recovery consumer) may be performed by a tagging function provided by the recovery framework API. Illustratively, the tag callback may invoke a tagging function of the framework API in order to tag (i.e., mark) a recovery log when the tag callback determines that the log is to be tagged. The recovery log may be marked by the tagging function from a set of distinct tag values. In an implementation, the set of distinct tag values may be formed from numeric powers of 2 (e.g., 2, 4, 8, 16). Accordingly, multiple distinct tag values ("tags") may be collected into a distinct tag group for a recovery log by bitwise OR operation of one or more distinct tags. Thus, repeated invocation of the tagging function by the tag procedure may accumulate tags (e.g., bitwise OR). In addition, a reserved distinct tag value (e.g., zero) may be used to remove (i.e., clear) tags.

In an aspect of the disclosure, the tags may have semantic meaning, e.g., instructions, to one or more of the recovery consumers. For example, a tag associated with the name "REPLAY" may instruct a recovery consumer (e.g., the file system consumer) to replay entries in the recovery log marked with that tag. In another example, a tag associated with the name "SAVE_LOG" may instruct a recovery consumer (e.g., the NVSAVE consumer) to save the recovery log contents from NVRAM to the storage pool. Accordingly, the one or more distinct tags may be used to instruct (i.e., direct) actions of the recovery consumer during recovery. That is, the distinct tags may encode instructions (i.e., actions) to the recovery consumers. Notably, the distinct tags may be opaque to the recovery framework and among the recovery consumers. For example, the "REPLAY" tag may be used to direct actions of the file system consumer, but may have no meaning (i.e., directs no action) for the NVSAVE consumer.

In an implementation, the framework entry 420 may also include an is-tagged callback field 424 registered by the recovery consumer and used in accordance with the recovery framework tagging technique. The is-tagged callback field may contain a callback (e.g., function pointer) to a procedure associated with the registering recovery consumer to determine whether a recovery log is tagged (i.e., marked with any of the distinct tags). The is-tagged callback 424 may include a parameter that indicates a recovery log and that returns a Boolean value (e.g., true/false). It will be apparent to those skilled in the art that the is-tagged callback parameter may be a pointer to a data structure representing one or more of the recovery logs 500.

Dependency Registration

In an aspect of the disclosure, the framework entry 420 may include a dependency data structure 428 used by a registering recovery consumer to register a dependency association with one more or more other recovery consumers. Each recovery consumer may be identified with a distinct recovery consumer identifier (recovery consumer ID) stored in the dependency data structure 428 and used to register the dependency association. Accordingly, a recovery consumer may register a dependency association with another recovery consumer by providing a recovery consumer ID of the other recovery consumer. As such, one or more invocations may be rendered of a registration function included in the recovery framework API. For example, assume the RAID consumer is assigned a consumer ID "1" and the file system consumer is assigned a consumer ID "2." The file system consumer may establish a dependency on the RAID consumer by registering a dependency association with the recovery consumer having consumer ID "1." Illustratively, multiple dependency associations may be registered in a list of dependency data structures 428a-n. It will be understood to those skilled in the art that other variations of data structures may be used to maintain the dependency data structures 428a-n, such as trees and arrays.

Alternatively, declaration of a dependency association among the recovery consumers may be determined by a dependency rule set based on registration of a type of recovery action (e.g., file system consumer and RAID consumer) rather than a registration of the dependency association. For example, consumer 1 (e.g., RAID consumer) may include (and thus register) a type of action to replay logs related to redundancy information among storage devices in RAID groups, whereas consumer 2 (e.g., file system consumer) may include (and thus register) a type of action to replay logs related to host data access requests. An exemplary dependency rule may specify that the log having the redundancy information (e.g., RAID log) be replayed before the log having the data access requests (e.g., file system log) since, as noted, file system recovery depends on RAID recovery. Accordingly, one or more dependency data structures may be generated, e.g., automatically by the dependency rule set, to establish the dependency (i.e., create a dependency association) based on the dependency rule set. Specifically, the rule set may be determined from a resource table (not shown) maintained by the failover monitor 348. The resource table may organize resources according to dependency, such that recovery consumers associated with the resources incur the same dependency as specified by the organization of the resources in the resource table. Accordingly, a dependency rule set may be extracted from the resource table and used to automatically generate the dependency data structures of the recovery framework. In an implementation, registration of a circular dependency may be avoided by construction of a framework graph described herein.

Recovery Framework Technique

Figure 5:
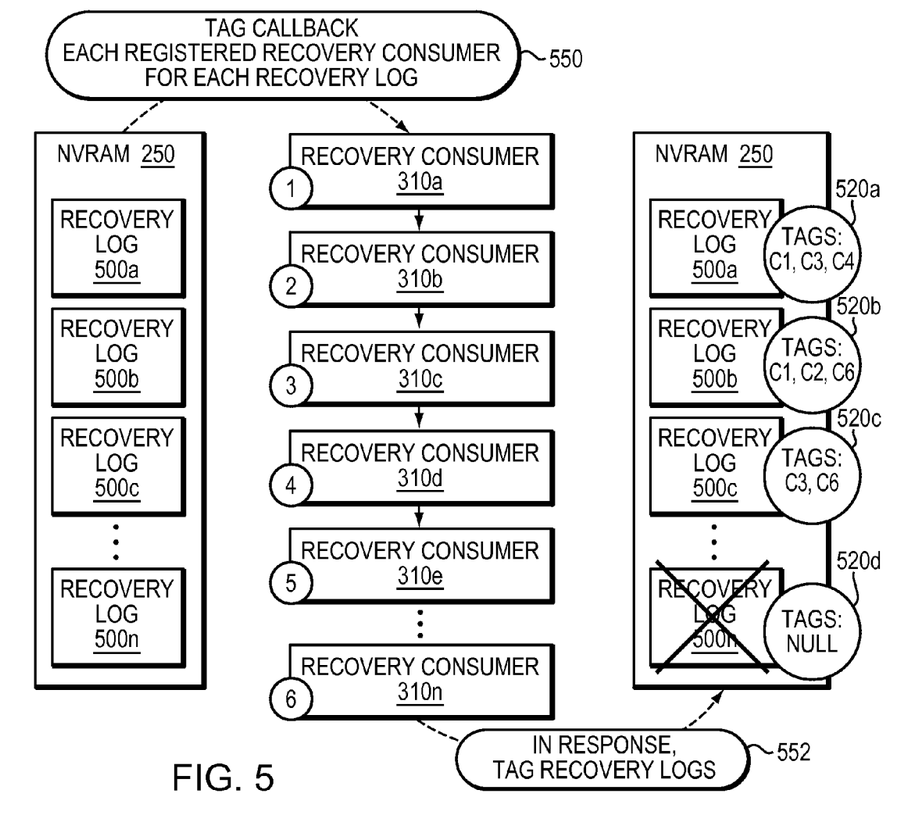
FIG. 5 illustrates a tagging technique of the recovery framework.

FIG. 5 illustrates the tagging technique of the recovery framework. Illustratively, the tagging technique 550 may invoke a tag callback for each recovery log of a registered recovery consumer when a failure occurs. In other words, the recovery framework may traverse the framework list 410 and invoke the tag procedure in the tag callback field 422 for the respective recovery consumer 310, passing a first parameter indicating the storage container(s) (e.g., volumes) to be recovered and a second parameter indicating the recovery log. In response, each tag callback may tag (i.e., mark) the respective recovery log according to the tagging technique response 552 (i.e., invoking the tagging function of the framework API) resulting in distinct tag groups 520a-n respectively associated with each recovery log 500a-n. Notably, an empty distinct tag group 520d (i.e., without any distinct tags) indicates the associated recovery log is unused during recovery and may be ignored, i.e., no tag callback procedure has tagged the recovery log 500n.

Illustratively, the distinct tag groups 520a-c may include the distinct tags C1, C2, C3, C4 and C6, each representative of a respective recovery consumer 310a, 310b, 310c, 310d and 310n (e.g., having consumer IDs "1", "2", "3", "4" and "6" respectively). As noted, each distinct tag (e.g., C1 and C2) may instruct an action (and a use) by the representative recovery consumer for the recovery log tagged with that distinct tag. For example, C1 (e.g., encoding instruction "REPLAY") may instruct the recovery consumer 310a (e.g., RAID consumer "1") to replay the recovery log 500a.

Illustratively, the tag group 520a having tags C1, C3 and C4 may indicate that recovery consumers 310a, 310c and 310n process (i.e., use) recovery log 500a according to the action(s) instructed by tags C1, C3 and C4. Specifically, recovery consumer 310a (e.g., consumer ID "1") may tag recovery log 500a with distinct tag C1 according the framework tagging technique (i.e., via the tag callback and responsive invocation of the framework API tagging function described above) and recovery consumer 310b (e.g., consumer ID "2") may tag recovery log 500a with distinct tag C2, and so on. The is-tagged callback may be used to determine whether the recovery log has been tagged. Notably, a recovery consumer 310e (e.g., consumer ID "5") may not tag any log (i.e., fails to tag any recovery log 500) and, thus, may be ignored in recovery.

Recovery Framework Graph

Figure 6:
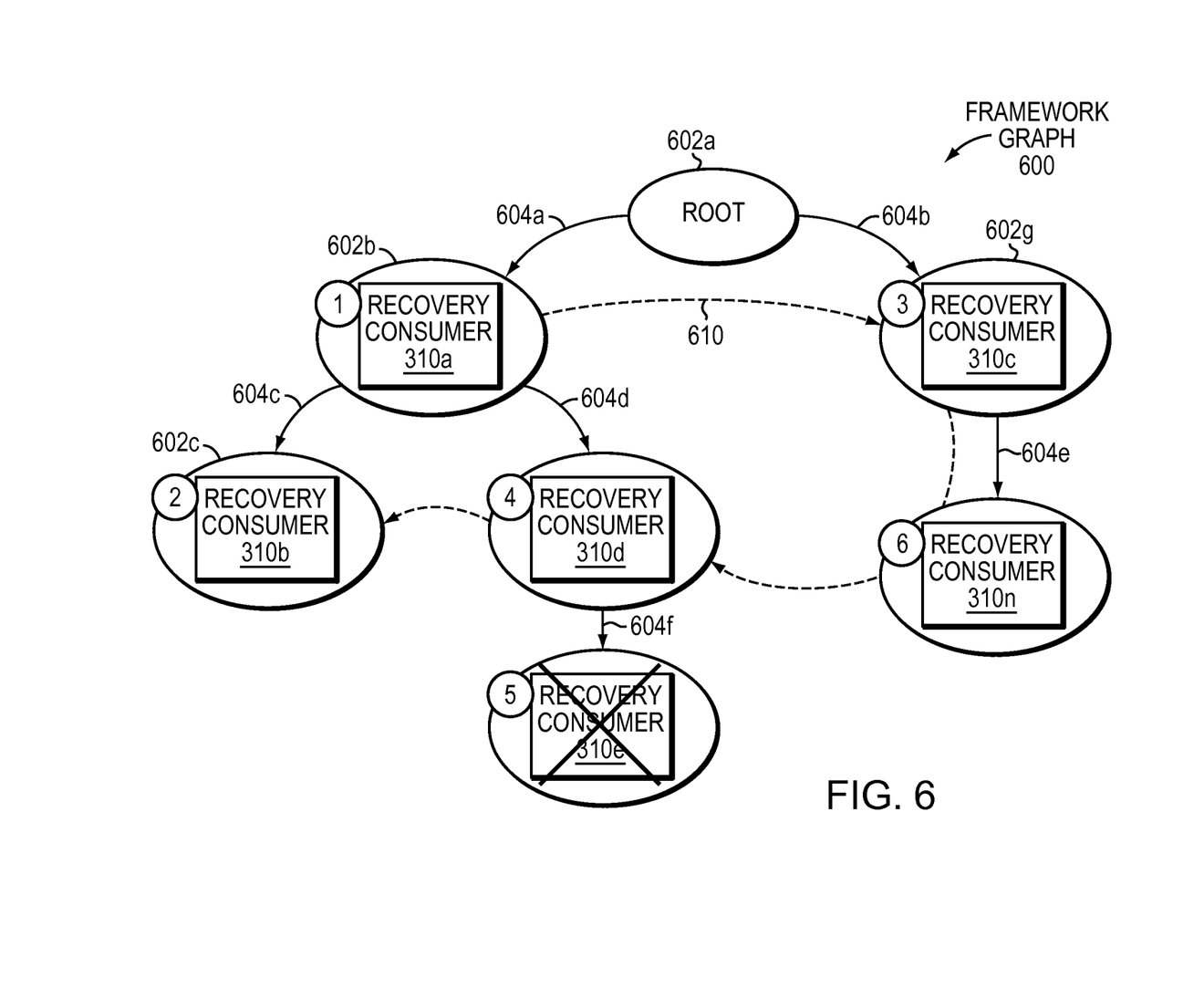
FIG. 6 illustrates a framework graph.

FIG. 6 illustrates a framework graph used by the recovery framework 400 to coordinate the recovery consumers 310a-n. The framework graph may be constructed from the registered dependency associations stored in the dependency data structures 428a-n. Illustratively, the framework graph 600 represents the dependency associations as a directed graph where each vertex 602 (i.e., graph node) of the graph represents a recovery consumer 310a-n and each directed edge 604 of the graph represents a dependency association. Recovery consumers may declare dependencies such that the respective recovery actions of the consumer are not executed until all dependent consumers have completed their respective recovery actions, e.g., consumer ID 1 that depends on consumer ID 2 waits until consumer ID 2 has completed all recovery actions. In other words, the recovery consumers may be ordered and executed serially according to their dependencies. Alternatively, the framework graph 600 may be constructed from the dependency rule set. For example, the graph may be constructed (i.e., vertex and edge added) using the above exemplary rule such that consumer ID 2 (first vertex) depends on (directed edge) consumer (second vertex).

Illustratively, the framework graph 600 may include a root vertex 602a and one or more directed edges 604 to one or more vertices 602. The graph may be constructed (i.e., vertex and edge added) in accordance with the registered dependency. For example, the dependency "file system consumer 2 depends on RAID consumer 1" yields a framework graph 600 wherein consumer ID 2 (vertex 602c) depends on (directed edge 604c) consumer ID 1 (vertex 602b) and a path from the vertex 602b to the vertex 602 via edge 604c denotes that the recovery actions of consumer 2 are executed after (i.e., wait on) the recovery actions of consumer ID 1. Notably, the framework graph may be implemented such that independent paths in the graph represent recovery consumers which may execute their recovery actions in parallel. In other words, two or more vertices (e.g., 602 and 602g) of the framework graph having adjacent directed edges (e.g., 604a and 604b) may have no dependency and, thus, may be executed concurrently. For example, consumer 1 (vertex 602b) with directed edge 604a is adjacent to consumer ID 3 (e.g., vertex) with directed edge 604b and thus consumer 1 (e.g., RAID consumer) may execute concurrently with consumer 3 (e.g., NVSAVE consumer).

In an implementation, circular dependencies may be avoided by checking for circular paths within the graph as the graph is constructed (i.e., directed edges are added to the graph). Further, the framework graph 600 may be pruned by removing vertices (i.e., recovery consumers) that do not tag any log (e.g., consumer ID 5) using, e.g., the is-tagged callback.

Illustratively, the framework 400 may traverse (i.e., walk) the framework graph 600 and, for each vertex 602 encountered, notify the associated recovery consumer 310 to initiate its respective recovery actions. Specifically, the framework may traverse the graph breadth first, so that recovery consumers without associated dependencies may be notified in parallel and, thus, may execute their actions concurrently. For example, the breadth first path 610 of the framework graph 600 may be traversed via a consumer ID sequence 1, 3, 6, 4, and 2. Consumers 1 and 3 share no dependency and, thus, may be notified in parallel (i.e., executed concurrently). Similarly, consumer IDs 2 and 6, as well as consumer IDs 2 and 4, may execute in parallel. However, consumer IDs 6 and 3 share a dependency (e.g., directed edge 604e) and, accordingly, consumer ID 6 must wait for consumer 3 (consumer 310c) to complete because directed edge 604e indicates that consumer ID 6 depends on consumer ID 3.

Figure 7:
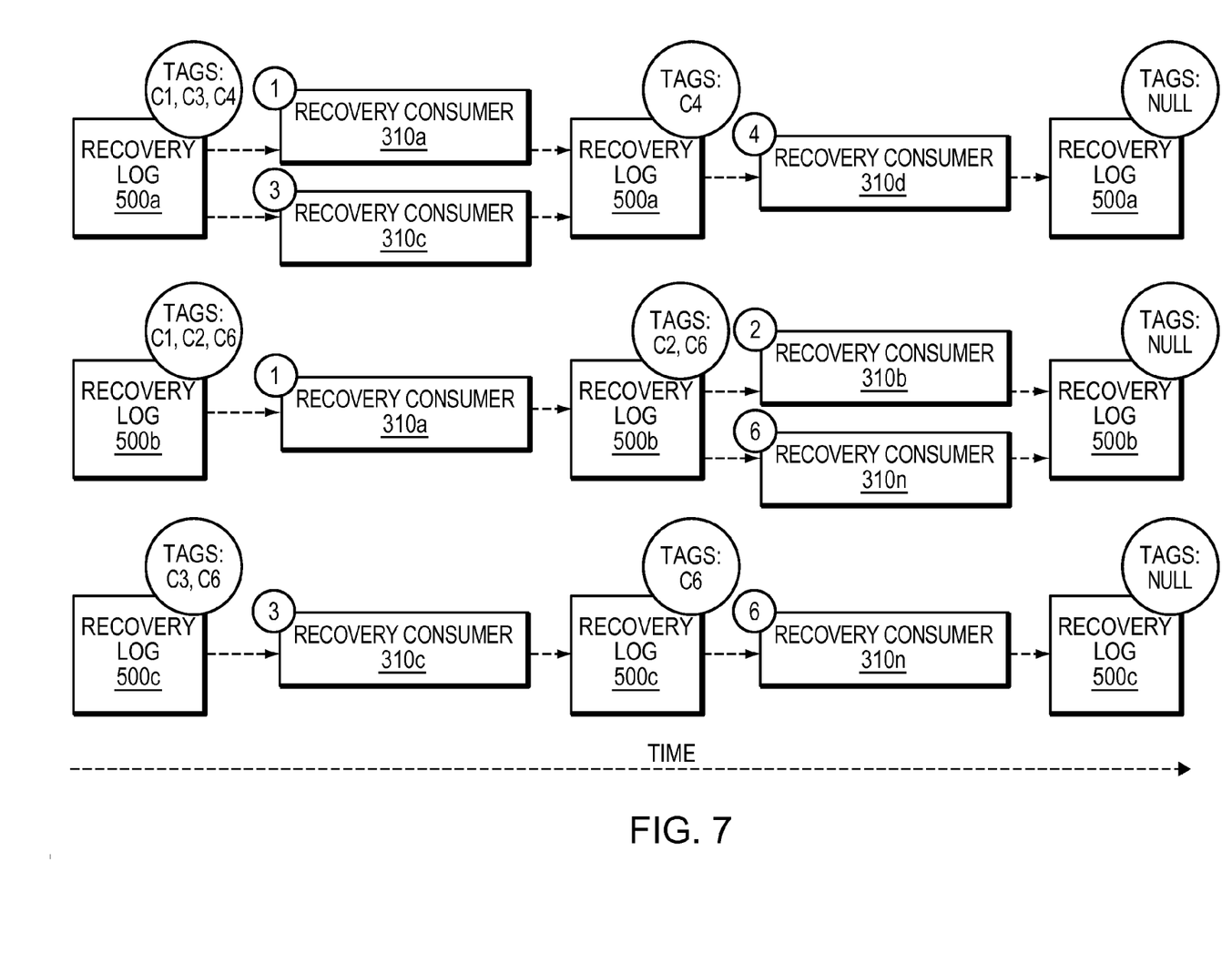
FIG. 7 illustrates an advancement technique of recovery consumers during recovery.

Recovery Consumer Advancement Technique,

FIG. 7 illustrates an advancement technique of recovery consumers during recovery. Illustratively, each recovery log 500a, 500b and 500c may be processed by the recovery consumers in accordance with the advancement technique. As each recovery consumer (e.g., consumer ID 1) processes a recovery log 500 (e.g., log 500a) having a set of distinct tags (e.g., C1, C3, and C4), one or more of the distinct tags may be removed as each recovery consumer completes processing of the log. That is, as each recovery consumer completes execution of its respective recovery actions, the framework 400 is notified of completion and the one or more tags marked by the recovery consumer may be removed from the associated log. The framework may then notify, e.g., in serial fashion, a next dependent (i.e., waiting) consumer (e.g., consumer ID 4) to initiate its respective recovery actions. Notably, each of the logs 500a, 500b, 500c may be processed concurrently such that as tags are removed different concurrency among the recovery consumers may occur. For example, consumer ID 2 and consumer ID 6 may execute in parallel to process log 500b when distinct tag C1 is removed from log 500b. The technique ends when all distinct tags are removed (i.e., null distinct tag group) for each recovery log 500. In this manner, the consumer recovery framework 400 ensures that all recovery consumers execute their respective recovery actions while permitting a high degree of parallelism and satisfying the consumer dependencies.

While there have been shown and described illustrative implementations of a recovery consumer framework for execution of recovery actions by one or more recovery consumers to enable efficient recovery of information in a storage system after a failure event, it is to be understood that various other adaptations and modifications may be made within the spirit and scope of the embodiments herein. For example, implementations have been shown and described herein with relation to parallel or concurrent execution of recovery actions to reduce recovery time (i.e., duration) for the storage system. However, use of the terms "parallel," "concurrent," and/or "parallelized" in their broader sense are not limited, and may, in fact, may allow for execution of the described procedures and techniques on (i) a uniprocessor that carries out simultaneous multiple threads of execution of processes, (ii) parallel processors, or combinations thereof.

The foregoing description has been directed to specific aspects of the disclosure. It will be apparent, however, that other variations and modifications may be made to the described implementations, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the aspects of the disclosure. Therefore, it is the object of the appended claims to cover all such variations and modifications as come within the true spirit and scope of the subject matter.

What is claimed is:

1. A method for processing one or more logs by a plurality of recovery consumers comprising:
    registering a callback by a first recovery consumer of the plurality of recovery consumers;
    registering a dependency on the first recovery consumer by a second recovery consumer of the plurality of recovery consumers;
    determining, by the callback, whether to tag a first log of the one or more logs; and
    in response to determining to tag the first log, executing the second recovery consumer such that the second recovery consumer waits for the first recovery consumer to complete processing of the first log.

2. The method of claim 1 further comprising:
    creating a graph having a first vertex associated with the first recovery consumer and a second vertex associated with the second recovery consumer, and having directed edge from the first vertex to the second vertex.

3. The method of claim 1 wherein the first log is marked with a tag, and wherein the tag controls one or more actions of the second recovery consumer.

4. The method of claim 1 further comprising:
    in response to determining whether to tag the first log, pruning the first log from the one or more logs processed.

5. The method of claim 2, further comprising:
    notifying the first recovery consumer and second recovery consumer while traversing the graph breadth first.

6. The method of claim 2 further comprising:
    notifying the first recovery consumer and a third recovery consumer of the plurality of recovery consumers such that the first recovery consumer and third recovery consumer execute currently.

7. The method of claim 3 further comprising:
    removing the tag marked on first log when the first recovery consumer completes processing of the first log.

8. The method of claim 3 wherein the tag encodes an instruction to replay the first log.

9. The method of claim 3 wherein a tagging function is invoked by the callback to mark the first log.

10. The method of claim 1 further comprising:
    in response to examining a property of the first log, delaying processing of the first log by the second recovery consumer.

11. A non-transitory machine readable medium having stored thereon instructions for processing one or more logs by a plurality of recovery consumers comprising machine executable code which when executed by at least one machine causes the machine to:
    register a callback by a first recovery consumer of the plurality of recovery consumers;
    register a dependency on the first recovery consumer by a second recovery consumer of the plurality of recovery consumers;
    determine, by the callback, whether to tag a first log of the one or more logs; and
    in response to determining to tag the first log, execute the second recovery consumer such that the first second recovery consumer waits for the first recovery consumer to complete processing of the first log.

12. A system comprising:
a non-volatile memory connected to a processor via a bus, wherein one or more logs are recorded in the non-volatile memory;
a storage operating system executing on the processor, the storage operating system when executed operable to:
register a callback by a first recovery consumer of a plurality of recovery consumers;
register a dependency on the first recovery consumer by a second recovery consumer of the plurality of recovery consumers;
determine, by the callback, whether to tag a first log of the one or more logs;
in response to determining to tag the first log, execute the second recovery consumer such that the second recovery consumer waits for the first recovery consumer to complete processing of the first log.

13. The system of claim 12, the storage operating system when executed further operable to:
create a graph having a first vertex associated with the first recovery consumer and a second vertex associated with the second recovery consumer, and having a directed edge from the first vertex to the second vertex.

14. The system of claim 12, wherein the first log is marked with a tag, and wherein the tag controls one or more actions of the second recovery consumer.

15. The system of claim 12, wherein the storage operating system when executed is further operable to:
in response to determining whether to tag the first log, prune the first log from the one or more logs processed.

16. The system of claim 13, wherein the storage operating system when executed is further operable to:
notify the first recovery consumer and second recovery consumer while traversing the graph breadth first.

17. The system of claim 13, wherein the storage operating system when executed is further operable to:
remove the tag marked on first log when the first recovery consumer completes processing of the first log.

18. The system of claim 14, wherein the tag encodes an instruction to replay the first log.

19. The system of claim 14, wherein a tagging function is invoked by the callback to mark the first log.

20. The system of claim 13, wherein the storage operating, system when executed is further operable to:
in response to examining a property of the first log, delay processing of the first log by the second recovery consumer.

* * * * *